United States Patent
Araki et al.

(10) Patent No.: US 11,619,821 B2
(45) Date of Patent: Apr. 4, 2023

(54) HEAD-MOUNTED DISPLAY

(71) Applicant: Sony Interactive Entertainment Inc., Tokyo (JP)

(72) Inventors: Takamasa Araki, Tokyo (JP); Takayuki Tateno, Chiba (JP); Yuto Fukuoka, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 803 days.

(21) Appl. No.: 16/604,440

(22) PCT Filed: May 24, 2018

(86) PCT No.: PCT/JP2018/020052
§ 371 (c)(1),
(2) Date: Oct. 10, 2019

(87) PCT Pub. No.: WO2018/221387
PCT Pub. Date: Dec. 6, 2018

(65) Prior Publication Data
US 2020/0159028 A1  May 21, 2020

(30) Foreign Application Priority Data
May 31, 2017  (JP) .............................. JP2017-108208

(51) Int. Cl.
*G02B 27/01* (2006.01)
*G06F 1/16* (2006.01)
*H04R 1/10* (2006.01)

(52) U.S. Cl.
CPC ....... *G02B 27/0176* (2013.01); *G06F 1/1605* (2013.01); *H04R 1/1016* (2013.01); *G02B 2027/0178* (2013.01); *H04R 2499/15* (2013.01)

(58) Field of Classification Search
CPC .. G02B 27/0176; G06F 1/1605; H04R 1/1016
See application file for complete search history.

(56) References Cited

U.S. PATENT DOCUMENTS 6,351,252 B1 * 2/2002 Atsumi .............. G02B 27/0176
345/8
6,914,583 B1    7/2005 Tatsuo
(Continued)

FOREIGN PATENT DOCUMENTS

CN  105182533 A  12/2015
CN  105929533 A   9/2016
(Continued)

OTHER PUBLICATIONS

First Office Action for corresponding application CN 201880033991, 20 pages, dated May 8, 2021.
(Continued)

*Primary Examiner* — Simon King
(74) *Attorney, Agent, or Firm* — Matthew B. Dernier, Esq.

(57) ABSTRACT

To propose a head-mounted display capable of enhancing convenience with respect to earphones. A head-mounted display (1) includes: a device main body (10) with a display device (11) incorporated therein; a mounting band (20) which extends toward the rear side from the device main body (10) and is used for mounting to a user's head; a right earphone holding section (24R) which is provided at a right portion of the mounting band (20) and to and from which a right earphone (31R) can be attached and detached; and a left earphone holding section (24L) which is provided at a left portion of the mounting band (20) and to and from which a left earphone (31L) can be attached and detached. According to the HMD 1, the user can recognize the positions of the earphones (31R) and (31L) without visual confirmation.

20 Claims, 8 Drawing Sheets

(56) References Cited

U.S. PATENT DOCUMENTS

| | | | |
|---|---|---|---|
| 9,703,103 B2 | 7/2017 | Araki | |
| 9,851,091 B2 | 12/2017 | Im | |
| 10,289,205 B1 * | 5/2019 | Sumter | ................. G06F 3/0346 |
| 2002/0005819 A1 | 1/2002 | Ronzani | |
| 2011/0051982 A1 | 3/2011 | Abreu | |
| 2013/0156247 A1 | 6/2013 | Gary | |
| 2016/0238236 A1 | 8/2016 | Im | |
| 2017/0017085 A1 | 1/2017 | Araki | |
| 2017/0112240 A1 | 4/2017 | Lee | |

FOREIGN PATENT DOCUMENTS

| | | |
|---|---|---|
| CN | 106455772 A | 2/2017 |
| CN | 206117947 U | 4/2017 |
| EP | 1207690 A1 | 5/2002 |
| EP | 3009874 A1 | 4/2016 |
| JP | 0658693 U | 8/1994 |
| JP | 08047075 A | 2/1996 |
| JP | 2016105588 A | 6/2016 |
| WO | 2015137165 A1 | 9/2015 |

OTHER PUBLICATIONS

International Preliminary Report on Patentability and Written Opinion for corresponding application PCT/JP2018/020052, 14 pages, dated Dec. 3, 2019.
Extended European Search Report for corresponding application EP 18808787.8, 18 pages, dated Dec. 15, 2020.
International Search Report for corresponding application PCT/JP2018/020052, 3 pages, dated Aug. 7, 2018.

\* cited by examiner

HEAD-MOUNTED DISPLAY

TECHNICAL FIELD

The present invention relates to a head-mounted display.

BACKGROUND ART

Head-mounted displays to be mounted to a user's head are in use. A head-mounted display described in the description of WO 2015/137165 includes a main body in which a display to be disposed just before the user's eyes is incorporated, and a mounting band extending toward the rear side from the main body. When the head-mounted display is used, the mounting band is mounted to the user's head.

SUMMARY

Technical Problem

A user may use a head-mounted display while listening to a sound or voice through earphones. In the case of a head-mounted display according to the related art, the user may feel inconvenience with respect to the earphones. For instance, when the user mounts the head-mounted display on the user's head, the user's line of sight is closed with the display, and, therefore, it is necessary for the user to feel for the earphones. In this case, the user may be incapable of finding the earphones immediately and may feel inconvenience.

One of objects of the present description is to propose a head-mounted display capable of enhancing convenience with respect to earphones.

Solution to Problem

A head-mounted display according to an embodiment of the present invention includes: a main body with a display device incorporated therein; a mounting band that extends toward a rear side from the main body and is used for mounting to a user's head; a right earphone holding section which is provided at a right portion of the mounting band and to and from which a right earphone can be attached and detached; and a left earphone holding section which is provided at a left portion of the mounting band and to and from which a left earphone can be attached and detached. According to this head-mounted display, the user can recognize the positions of the earphones without visual confirmation, and, therefore, convenience with respect to the earphones can be enhanced. Note that the right earphone and the left earphone are not constituent elements of the present invention. In other words, a head-mounted display which has earphone holding sections but does not have any earphone is also within the scope of the present invention.

DESCRIPTION OF EMBODIMENT

An embodiment of the present invention will be described below. In the following description, the directions denoted by Y1 and Y2 in FIG. 1 will be referred to as forward and rearward directions, respectively, and the directions denoted by Z1 and Z2 in FIG. 1 will be referred to as upward and downward directions, respectively. In addition, the directions denoted by X1 and X2 in FIG. 2 will be referred to as rightward and leftward directions, respectively. Besides, in the following description, a head-mounted display will be referred to as an HMD.

Figure 1:
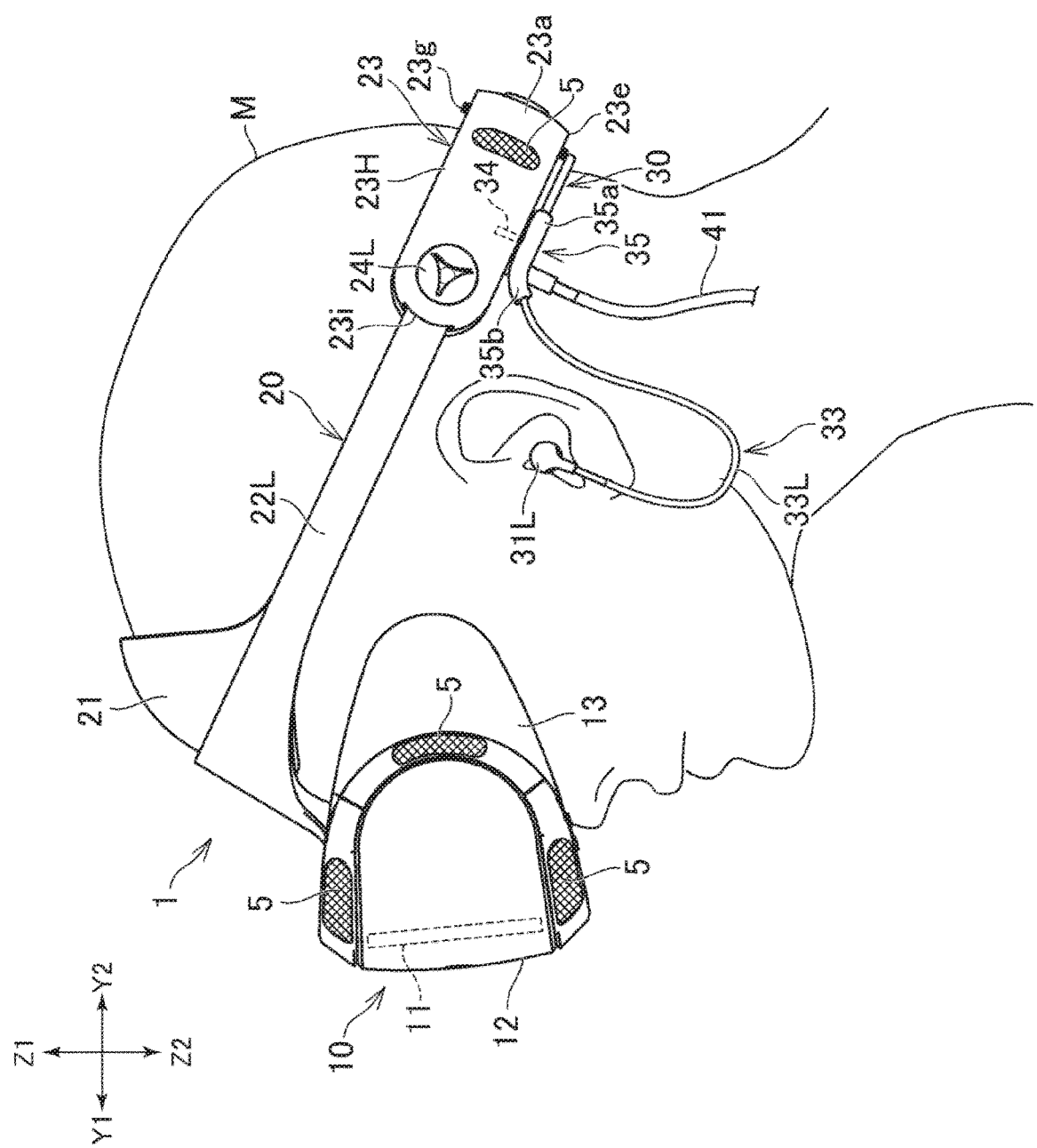
FIG. 1 is a side view depicting an example of a head-mounted display as an embodiment of the present invention.
Figure 2:
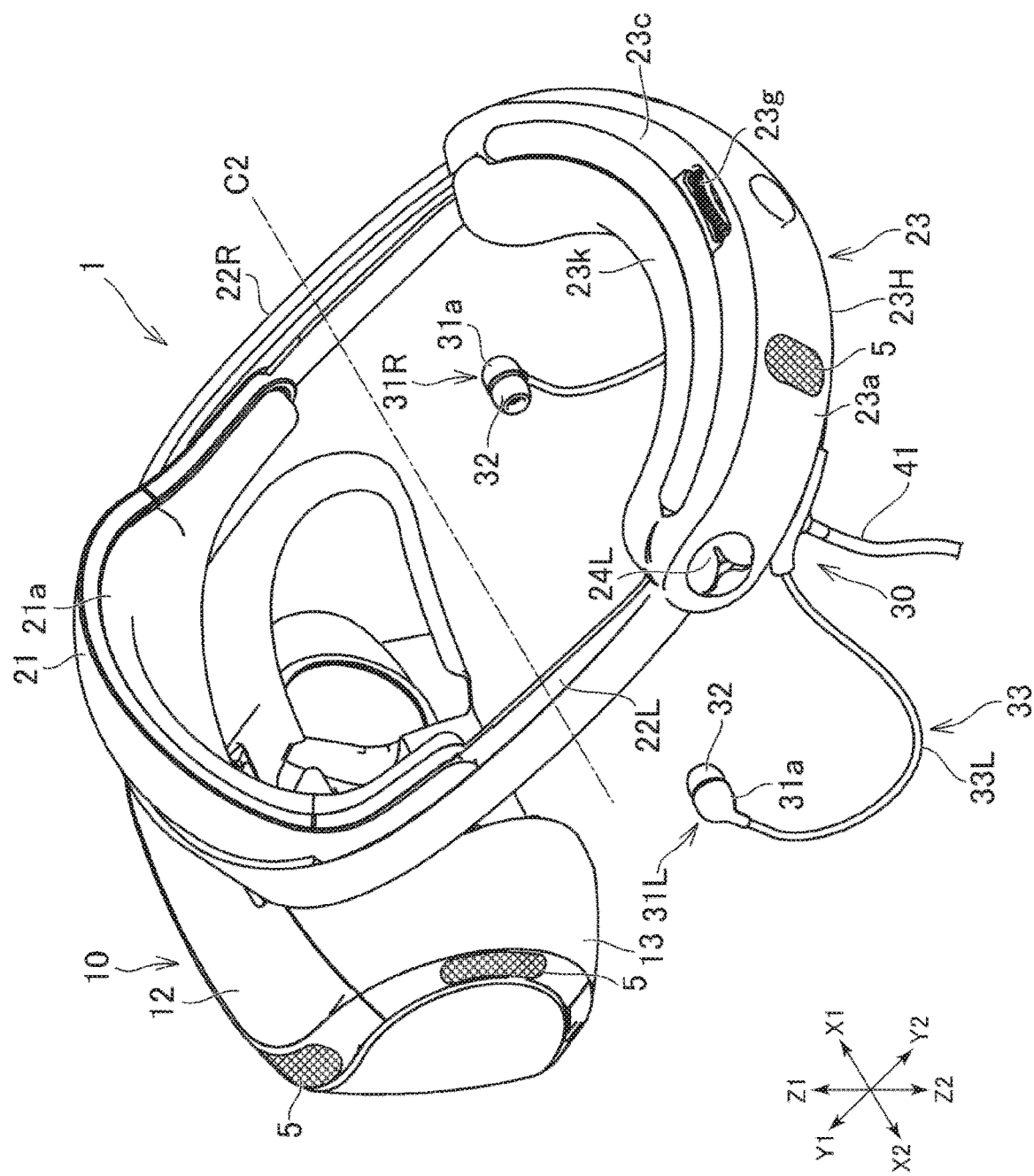
FIG. 2 is a perspective view of the head-mounted display.

As depicted in FIG. 1, an HMD 1 has a device main body 10 with a display device 11 incorporated therein. The display device 11 may be, for example, a liquid crystal display or an organic electroluminescence display, but the kind thereof is not particularly limited. When the HMD 1 is used, the device main body 10 covers the front side of the user's eyes. The device main body 10 has a housing 12 in which the display device 11 is accommodated. As depicted in FIG. 2, the HMD 1 may have a light-shielding member 13 extending rearward from a rear edge of the housing 12. The light-shielding member 13 closes a gap between the rear edge of the housing 12 and the user's face.

As depicted in FIG. 1, the HMD 1 has a mounting band 20 extending toward the rear side from the device main body 10. When the HMD 1 is used, the mounting band 20 is mounted to a user's head M. That is, the mounting band 20 is annular in shape in plan view, and the head M is disposed inside thereof. In the example of the HMD 1, the mounting band 20 extends obliquely rearward and downward. Unlike this, the mounting band 20 may extend horizontally. Besides, another band for mounting to the user's head M may be provided in addition to the mounting band 20.

As depicted in FIG. 2, in the example of the HMD 1, the mounting band 20 has, at its frontmost portion, a front support section 21 connected to an upper portion of the device main body 10. When the HMD 1 is used, the front support section 21 is put in contact with a front surface of the user's head. The front support section 21 may be provided with a cushion 21a at an inner surface (rear surface) thereof. Further, the inner surface (rear surface) of the front support section 21 may be curved such as to conform the front surface of the head M. The mounting band 20 has a right extension section 22R extending rearward from a right side portion of the front support section 21, and a left extension section 22L extending rearward from a left side portion of the front support section 21.

In addition, the mounting band 20 has, at a rear portion thereof, a rear support section 23 connected to rear portions of the extension sections 22R and 22L. When the HMD 1 is used, the rear support section 23 is put in contact with a rear side of the head M (see FIG. 1). The rear support section 23 may be provided with a cushion 23k (see FIG. 2) at an inner surface (front surface) thereof. The rear support section 23 is configured to be movable in the front-rear direction relative to the extension sections 22R and 22L. This permits the size of the mounting band 20 to conform to the head M. In the example of the HMD 1, the rear support section 23 is curved in an arcuate shape. A rear portion of the left extension section 22L is inserted into the inside of the rear support section 23 via an opening 23i (see FIG. 1) formed at a front end on the left side of the rear support section 23, and a rear portion of the right extension section 22R is inserted into the inside of the rear support section 23 via an opening formed at a front end on the right side of the rear support section 23. The rear support section 23 has a housing 23H. A mechanism for moving the rear support section 23 forward and rearward relative to the extension sections 22R and 22L is disposed inside the housing 23H. In the example of the HMD 1, the rear support section 23 has an operation member 23g exposed at a surface of the housing 23H. The operation member 23g is rotatable, and, for example, when the operation member 23g is rotated in one direction, the rear support section 23 is moved forward. The mechanism incorporated in the rear support section 23 may be changed, as required.

Note that the structure of the mounting band 20 is not limited to its example in the HMD 1. For example, the mounting band 20 may not have the front support section 21. In this case, front ends of the extension sections 22R and 22L may be connected directly to the device main body 10. Specifically, the right extension section 22R may be connected to a right-side portion of the device main body 10, and the extension section 22L may be connected to a left-side portion of the device main body 10. In a further example, the mechanism for adjusting the size of the mounting band 20 may be provided not in the rear support section 23 but at the extension sections 22R and 22L.

As depicted in FIGS. 1 and 2, the HMD 1 has a plurality of light emitting sections 5 at an outer surface thereof. When the HMD 1 is used, an external camera detects light emitted from the light emitting sections 5 of the HMD 1. The camera is connected to an information processing device such as a game device and a personal computer. The information processing device calculates the position and posture of the HMD 1, or the position and posture of the user, based on information acquired by the camera. In the example of the HMD 1, the plurality of light emitting sections 5 are arranged along an outer peripheral edge of the housing 12 of the device main body 10. In addition, the plurality of light emitting sections 5 are disposed also at an outer peripheral surface (back surface) of the rear support section 23. The positions of the light emitting sections 5 may be modified as required.

As depicted in FIGS. 1 and 2, the HMD 1 has an earphone device 30. The earphone device 30 includes a left earphone 31L to be mounted to the user's left ear, and a right earphone 31R to be mounted to the user's right ear. In the example of the HMD 1, the earphones 31R and 31L are of a so-called canal type. Specifically, each of the earphones 31R and 31L includes a main body 31a incorporating a driver unit that outputs a sound, and an ear piece 32 attached to the main body 31a. The ear piece 32 includes a sound passage H1 (see FIG. 9) as a hole through which the sound outputted from the driver unit passes, and an outer peripheral portion 32a (see FIG. 9) formed in an umbrella shape with a center line C9 of the sound passage H1 as a center. When the earphones 31R and 31L are used, the ear pieces 32 are inserted in the user's external auditory canals. The ear pieces 32 are formed using an elastically deformable material such as an elastomer.

Note that the structure and kind of the earphones 31R and 31L are not limited to their examples in the HMD 1. For instance, the earphones 31R and 31L may be of an inner ear type. In this case, the earphones 31R and 31L may not have the ear pieces 32.

Figure 4:
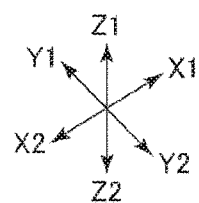
FIG. 4 is a perspective view depicting an outer peripheral surface of the rear support section.
Figure 4:
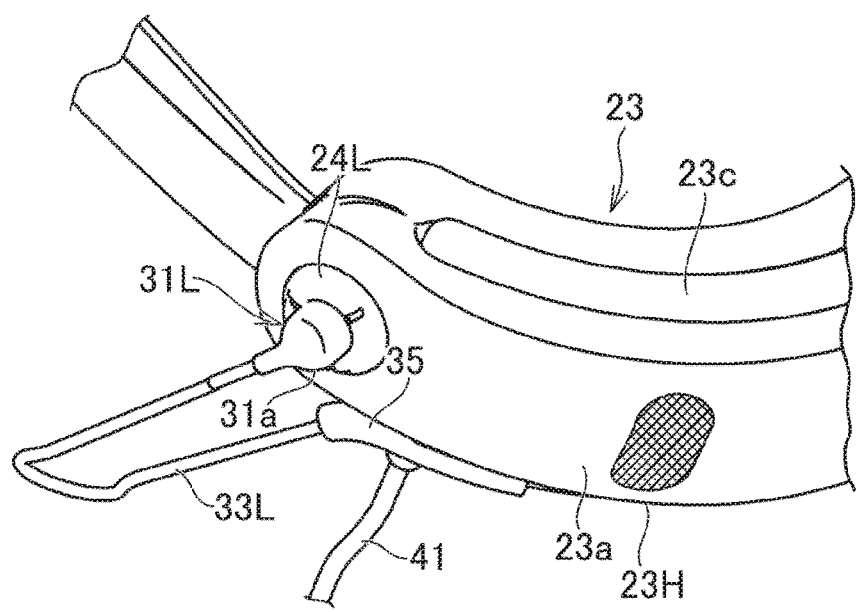

As depicted in FIG. 2, the HMD 1 has a left earphone holding section 24L provided at a left part of the mounting band 20 (the "left part" of the mounting band 20 is a part located on the left side relative to a center C1 in the left-right direction of the HMD 1). The HMD 1 has a right earphone holding section 24R (see FIG. 5B) provided at a right part of the mounting band 20 (the "right part" of the mounting band 20 is a part located on the right side relative to the center C1 of the HMD 1). The earphones 31L and 31R can be attached to the earphone holding sections 24L and 24R (see FIG. 4), and can be detached from the earphone holding sections 24L and 24R (see FIG. 2). According to the HMD 1, when the user does not mount the earphones 31R and 31L to the user's ears, the positions of the earphones 31R and 31L are fixed, whereby convenience can be enhanced. In addition, since the earphone holding sections 24R and 24L are located near the user's ears, the user can easily re-place the earphones 31R and 31L from the earphone holding section 24R and 24L to the user's own ears.

Figure 5A:
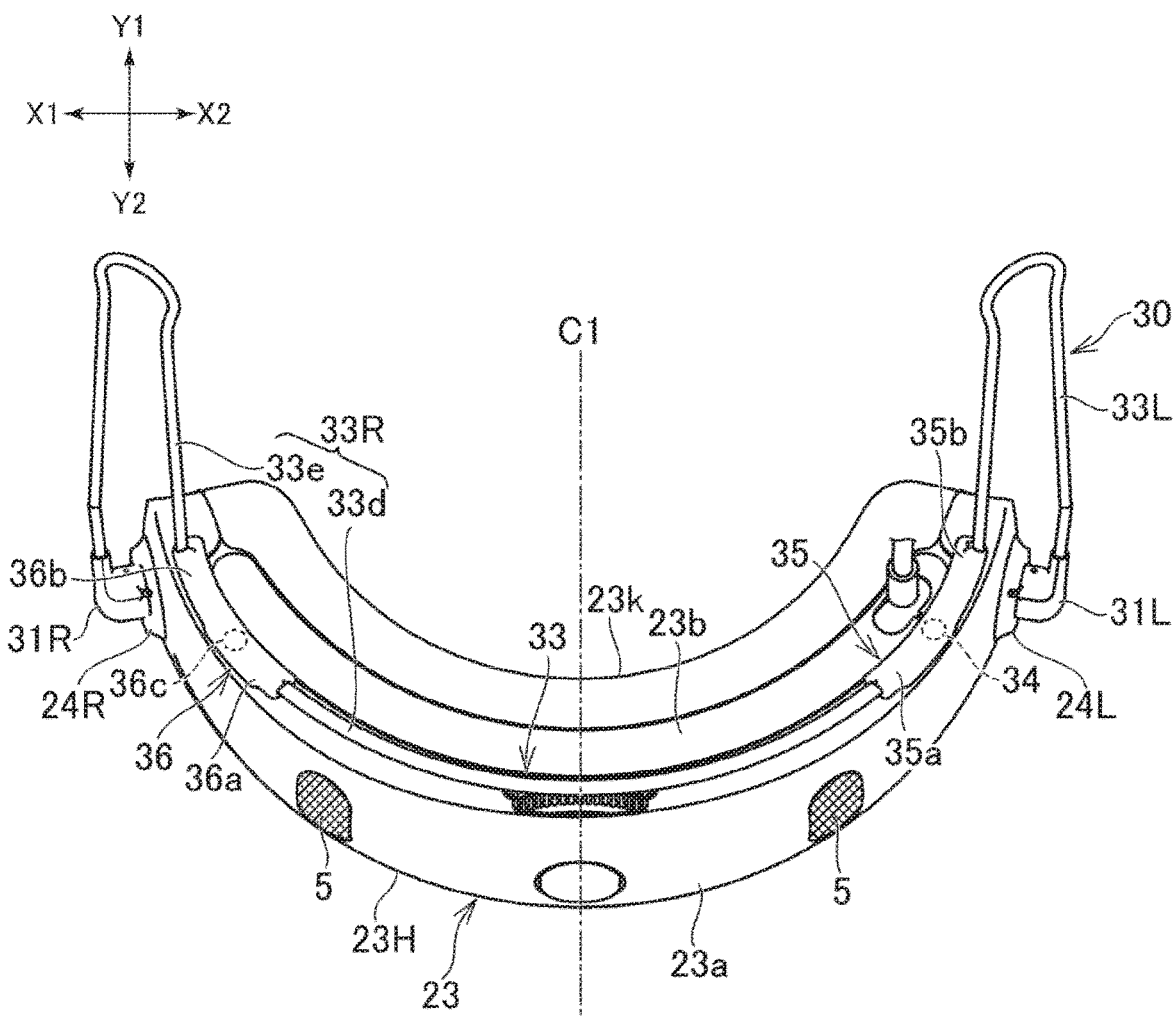
FIG. 5A is a bottom view depicting a lower surface of the rear support section. In this figure, an earphone device is attached to the rear support section.
Figure 5B:
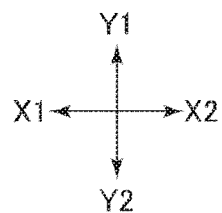
FIG. 5B is a bottom view depicting the lower surface of the rear support section. In this figure, the earphone device is detached from the rear support section.
Figure 5B:
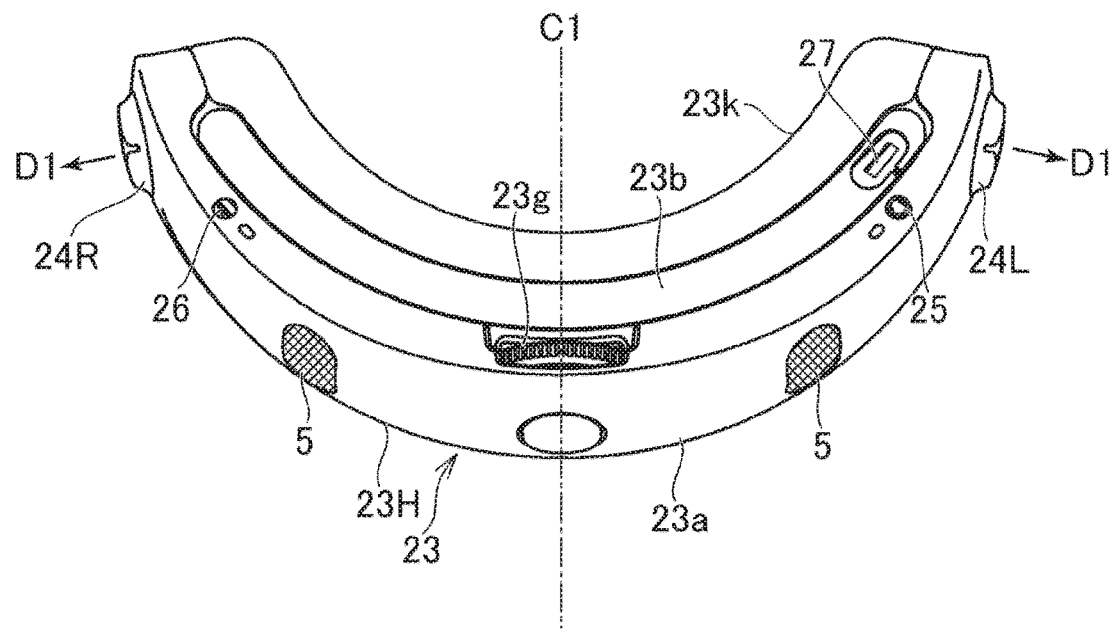

As depicted in FIG. 5B, in the example of the HMD 1, the left earphone holding section 24L is provided at a part located on the leftmost side of the mounting band 20, and the right earphone holding section 24R is provided at a part located on the rightmost side of the mounting band 20. Besides, in the example of the HMD 1, the earphone holding sections 24R and 24L are located on the rear side relative to a center C2 (see FIG. 2) in the front-rear direction of the mounting band 20. The earphone holding sections 24R and 24L may be located at the center C2, or may be located on the front side relative to the center C2, unlike in the example of the HMD 1.

The earphone holding sections 24R and 24L are configured such that end portions of the earphones 31L and 31R can be inserted therein. As aforementioned, in the example of the HMD 1, the earphones 31R and 31L have the ear pieces 32 at their end portions. The earphone holding sections 24R and 24L are configured such that the ear pieces 32 can be inserted therein. The earphone holding sections 24R and 24L are formed with openings 24m (see FIG. 7). The ear piece 32 can be inserted into the opening 24m. This ensures that the user can easily attach and detach the ear pieces 32 to and from the earphone holding sections 24R and 24L.

The earphones 31R and 31L may be of the inner ear type. In this case, the earphone holding sections 24R and 24L may be configured such that the housings of the earphones 31R and 31L (the housings in which the driver units are accommodated) can be inserted therein. In addition, the earphone holding sections 24R and 24L may be configured such that canal-type earphones and inner ear type earphones can both be inserted therein.

As aforementioned, the mounting band 20 has the rear support section 23. The rear support section 23 is located at a rear portion of the mounting band 20, and is movable in the front-rear direction relative to the other part of the mounting band 20 (specifically, the extension sections 22R and 22L). The rear support section 23 is curved in an arcuate shape, and a right end and a left end of the rear support section 23 are located on the front side relative to a central portion. The rear support section 23 is disposed in left-right symmetry with respect to the center C1 of the HMD 1. The rear support section 23 includes a lower surface 23b (see FIG. 5A), an upper surface 23c (see FIG. 2), and an outer peripheral surface 23a (see FIG. 2).

In the example of the HMD 1, the earphone holding sections 24R and 24L are provided at the rear support section 23. Specifically, the earphone holding sections 24R and 24L are provided at the outer peripheral surface 23a of the rear support section 23. In addition, the earphone holding sections 24R and 24L are located at frontmost portions of the rear support section 23. The layout of the earphone holding sections 24R and 24L is not limited to that in the example of the HMD 1. For example, the earphone holding sections 24R and 24L may be provided respectively at the extension sections 22R and 22L of the mounting band 20.

The right earphone holding section 24R is disposed such that its opening 24m is directed to the right side. The left earphone holding section 24L is disposed such that its opening 24m is directed to the left side. This layout of the earphone holding sections 24R and 24L permits the earphones 31R and 31L to be attached and detached in the left-right direction to and from the earphone holding sections 24R and 24L. Therefore, the user can smoothly perform the attaching and detaching operations. In the example of the HMD 1, the opening directions of the openings 24m (the directions of arrows D1 depicted in FIG. 5B) are slightly inclined to the rear side. The opening directions of the openings 24m may be parallel to the left-right direction, or may be slightly inclined to the front side, unlike in the example of the HMD 1.

As depicted in FIG. 5B, the earphone holding sections 24R and 24L are bulging relative to a surface of the mounting band 20. More specifically, the earphone holding sections 24R and 24L are bulging relative to the outer peripheral surface 23a of the rear support section 23. In other words, the right earphone holding section 24R is slightly projected rightward from the outer peripheral surface 23a, and the left earphone holding section 24L is slightly projected leftward from the outer peripheral surface 23a. This structure permits the user to find the positions of the earphone holding sections 24R and 24L by touching the outer peripheral surface 23a with a finger or fingers.

The earphone holding sections 24R and 24L may be recessed relative to the outer peripheral surface 23a of the rear support section 23, unlike in the example of the HMD 1. This structure also permits the user to find the positions of the earphone holding sections 24R and 24L by touching the outer peripheral surface 23a with a finger or fingers.

Figure 7:
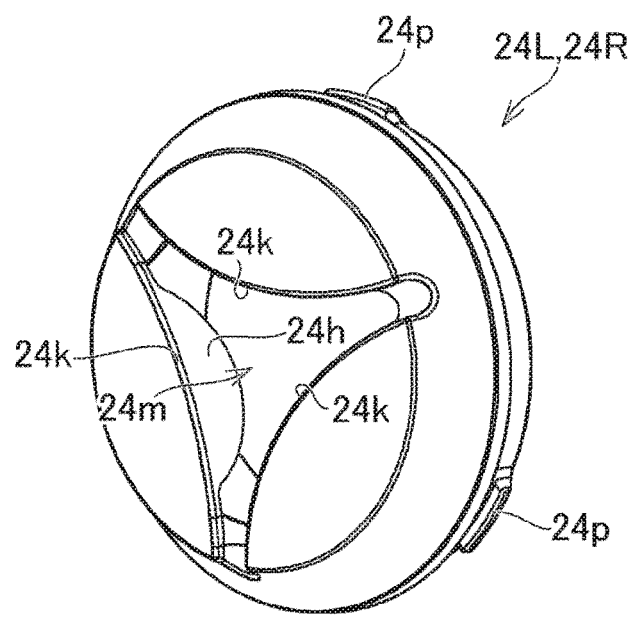
FIG. 7 is a perspective view of the earphone holding section.
Figure 8:
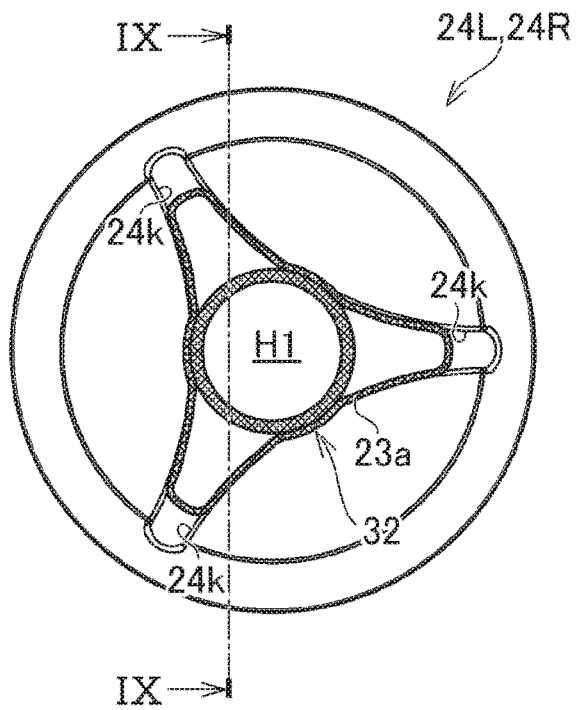
FIG. 8 is a front view depicting the earphone holding section holding an ear piece. In this figure, the ear piece possessed by an earphone is fitted to the earphone holding section, and is deformed in conformity with the shape of an opening in the earphone holding section.
Figure 9:
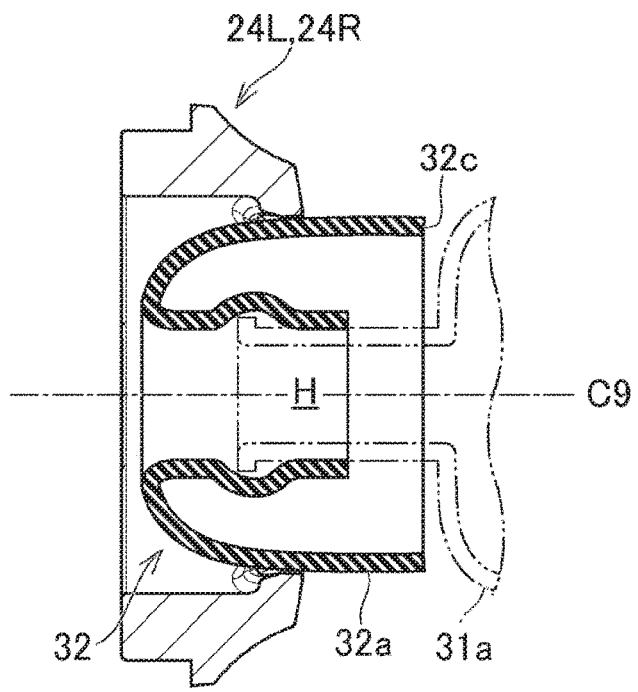
FIG. 9 is a sectional view taken along line IX-IX of FIG. 8. In this figure, a main body of the earphone is depicted in alternate long and two short dashes line.

The ear pieces 32 can be inserted into the openings 24m in the earphone holding sections 24R and 24L in the direction of their sound passages H1 (see FIGS. 7 and 9). Inner edges of the openings 24m in the earphone holding sections 24R and 24L are formed such as to clamp the ear pieces 32. Specifically, the inner edge of the opening 24m is configured such as to clamp an outer peripheral portion 32a (see FIG. 8) of the ear piece 32. In other words, the inner edge of the opening 24m is formed such that the ear piece 32 is elastically deformed. This ensures that the earphone holding sections 24R and 24L can hold the earphones 31R and 31L by utilizing elastic forces of the ear pieces 32.

The ear piece 32 is circular when viewed in the direction of the sound passage H1 of the ear piece 32. On the other hand, the inner edge of the opening 24m is polygonal. As depicted in FIG. 8, in the example of the HMD 1, the inner edge of the opening 24m is substantially triangular, and has three edge portions 24k. The three edge portions 24k have the outer peripheral surface 23a of the ear piece 32 interposed therebetween, and keep the ear piece 32 elastically deformed. The shape of the opening 24m is not limited to that in the example of the HMD 1. The inner edge of the opening 24m may be tetragonal or other polygonal with a larger number of vertexes. In addition, the opening 24m may be elliptical.

As depicted in FIG. 7, the earphone holding sections 24R and 24L have, at the inner edges of the openings 24m, parts 24n extending in the insertion direction of the ear pieces 32 (the part 24n will hereinafter be referred to "inside flange"). The inside flange 24 prevents a rear edge 32c (see FIG. 9) of the outer peripheral portion 32a of the ear piece 32 from being caught on the inner edge of the opening 24m, and permits the ear piece 32 to be smoothly detached from the earphone holding sections 24R and 24L. In the example of the HMD 1, the three edge portions 24k of the opening 24m are formed with the inside flanges 24n, respectively. Note that the structure for preventing the rear edge 32c of the ear piece 32 from being caught on the inner edge of the opening 24m is not limited to the inside flange 24n.

Figure 6:
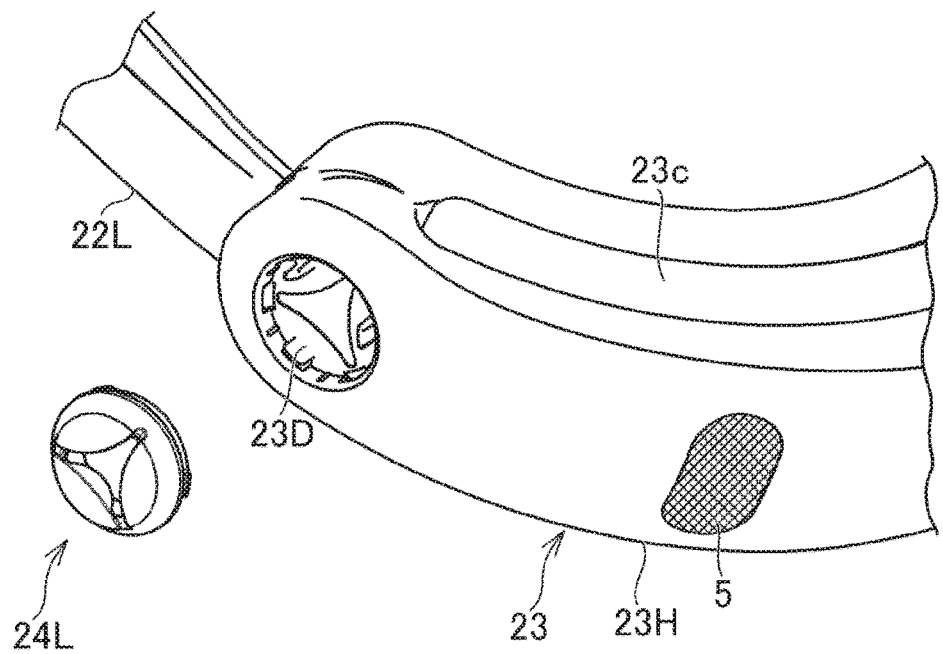
FIG. 6 is a perspective view depicting the rear support section from which an earphone holding section has been detached.

As aforementioned, the rear support section 23 has the housing 23H constituting an outer surface thereof. As depicted in FIG. 6, in the example of the HMD 1, the earphone holding sections 24R and 24L are members formed separately from the housing 23H, and are attached to the housing 23H. The housing 23H is formed with mounting sections 23d which are recesses or holes. The earphone holding sections 24R and 24L are fitted into the mounting sections 23d.

In the example of the HMD 1, the earphone holding sections 24R and 24L are circular, and the mounting sections 23d are also circular. The earphone holding sections 24R and 24L have, at outer peripheries thereof, engagement sections 24p to be caught on inside surfaces of the mounting sections 23d. The shapes of the earphone holding sections 24R and 24L and the mounting sections 23d may be modified, as required. In addition, the structure for mounting the earphone holding sections 24R and 24L to the mounting sections 23d may also be modified, as required.

The housing 23H is formed using a plastic (e.g., polyethylene, polystyrene, ABS). The earphone holding sections 24R and 24L are formed using a material which is more flexible than the housing 23H. In other words, the earphone holding sections 24R and 24L are formed using an elastically deformable material (e.g., elastomers (inclusive of rubbers)). This ensures that the earphone holding sections 24R and 24L can hold end portions (more specifically, the ear pieces 32) of the earphones 31R and 31L by utilizing the elastic forces thereof. In the example of the HMD 1, when the ear pieces 32 are inserted in the openings 24m in the earphone holding sections 24R and 24L, the edge portions 24k of the openings 24m are slightly elastically deformed, and the earphone holding sections 24R and 24L hold the ear pieces 32 by the elastic forces thereof. As aforementioned, the ear pieces 32 are formed using an elastically deformable material. Therefore, in the example of the HMD 1, the ear pieces 32 are held by the earphone holding sections 24R and 24L by the elastic forces of the ear pieces 32 and the elastic forces of the earphone holding sections 24R and 24L.

The material of the earphone holding sections 24R and 24L may not be an elastically deformable material, unlike in the example of the HMD 1. In addition, the earphone holding sections 24R and 24L may be formed using the same material as the material of the housing 23H. In this case, the earphone holding sections 24R and 24L may be integrally formed with the housing 23H.

The earphone device 30 includes a cable 33 extending from the earphones 31R and 31L, and a plug 34 (see FIG. 1) provided at an end portion of the cable 33. The cable 33 includes a right cable 33R (see FIG. 3) extending from the plug 34 toward the right earphone 31R, and a left cable 33L (see FIG. 3) extending from the plug 34 toward the left earphone 31L.

As depicted in FIG. 5B, the mounting band 20 has an earphone jack 25 for connection of the plug 34. The earphone jack 25 is located on the rear side relative to the earphone holding sections 24R and 24L. This layout of the earphone jack 25 makes it possible to prevent the cable 33 from becoming an obstacle to the user.

In the example of the HMD 1, the earphone jack 25 is provided at the rear support section 23. As aforementioned, the earphone holding sections 24R and 24L are also provided at the rear support section 23. Since both the earphone holding sections 24R and 24L and the earphone jack 25 are thus provided at the rear support section 23, extension or contraction (deformation) of the cable 33 would not be generated when the rear support section 23 is moved in the front-rear direction for adjusting the size of the mounting band 20.

In the example of the HMD 1, the earphone jack 25 is provided at the lower surface 23b of the rear support section 23. Therefore, as depicted in FIG. 1, when the earphone device 30 is used, the left cable 33L interconnecting the plug 34 and the left earphone 31L is curved such as to surround the lower side of the user's ear. As a result, the left cable 33L can be restrained from becoming an obstacle to the user. The position of the earphone jack 25 is not limited to that in the example of the HMD 1. For instance, the earphone jack 25 may be provided at the upper surface 23c of the rear support section 23.

The earphone jack 25 is spaced rightward or leftward from the center C1 in the left-right direction of the mounting band 20. As depicted in FIG. 5B, in the example of the HMD 1, the earphone jack 25 is spaced leftward from the center C1. Therefore, the left cable 33L interconnecting the left earphone 31L and the plug 34 can be shortened, with the result that the left cable 33L can be restrained from being largely bent.

In the example of the earphone device 30, the right cable 33R is longer than the left cable 33L. As depicted in FIG. 5B, the mounting band 20 (more specifically, the rear support section 23) has an attachment section 26 to which an intermediate portion of the right cable 33R is to be attached. The attachment section 26 is spaced rightward from the center C1 in the left-right direction of the mounting band 20. In other words, the attachment section 26 is spaced from the center C1 in the direction opposite to the earphone jack 25. This structure can restrain the right cable 33R from being bent largely.

The attachment section 26 is provided at the lower surface 23b of the rear support section 23, similarly to the earphone jack 25. Therefore, when the earphone device 30 is used, the right cable 33R interconnecting the plug 34 and the right earphone 31R is curved such as to surround the lower side of the user's ear, with the result that the right cable 33R can be restrained from becoming an obstacle to the user.

In the example of the HMD 1, the attachment section 26 is located at a position symmetrical with the earphone jack 25, with reference to the center C1 in the left-right direction of the mounting band 20. In other words, the distance from the center C1 to the earphone jack 25 and the distance from the center C1 to the attachment section 26 are substantially the same. This ensures that when the earphone device 30 is mounted to the mounting band 20, the beauty of the HMD 1 can be enhanced.

Figure 3:
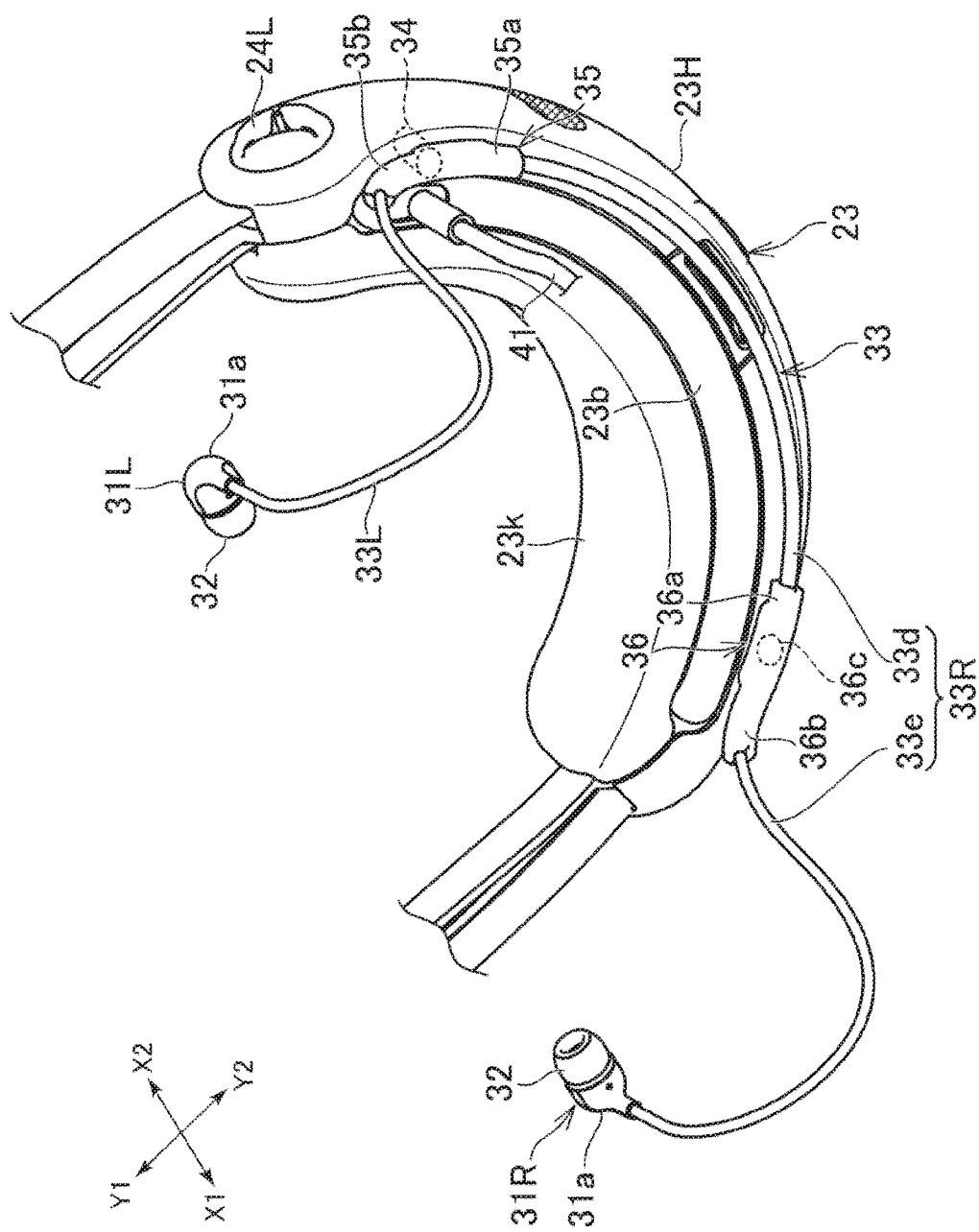
FIG. 3 is a perspective view depicting a lower surface of a rear support section possessed by the head-mounted display.

As depicted in FIG. 3, in the example of the HMD 1, a guide section 36 is attached to an intermediate portion of the right cable 33R. The guide section 36 is formed using a resin higher in rigidity than the right cable 33R. The guide section 36 is attached to the right cable 33R. The attachment section 26 provided in the rear support section 23 is, for example, a hole. In this case, the guide section 36 of the right cable 33R has an attached section (projection) 36c. With the attached section 36c inserted into the attachment section 26, the guide section 36 is attached to the attachment section 26. The attachment section 26 may not be a hole, unlike in the example of the HMD 1. For instance, the attachment section 26 may be formed in a hook shape that can hold the right cable 33R.

Note that the positional relation between the earphone jack 25 and the attachment section 26 is not limited to that in the example of the HMD 1. In the example of the HMD 1, the earphone jack 25 functions as an attachment section located on the opposite side of the center C1 from the attachment section 26. In other words, the earphone device 30 has the two attachment sections. An attachment section may be provided on the opposite side of the attachment section 26, and the earphone jack 25 may be provided at other position than the two attachment sections, unlike in the example of the HMD 1. For instance, the earphone jack 25 may be disposed at the center C1 in the left-right direction. In a further example, an attachment section to which an intermediate portion of the cable 33 is attached may be provided on the opposite side of the center C1 from the attachment section 26. In yet another example of the HMD, the earphone jack 25 may be located at a position spaced rightward from the center C1, and the attachment section 26 may be located at a position spaced leftward from the center C1, conversely to the example of the HMD 1.

When the HMD 1 is used, a moving image produced by an external information processing device (e.g., a game device or a personal computer) is displayed on the display device 11. As depicted in FIG. 5B, the HMD 1 is provided with a connector 27 to which a cable 41 for inputting moving image information to the HMD 1 can be connected. As the connector 27, there can be used, for example, one according to the High-Definition Multimedia Interface (HDMI) standard. As depicted in FIG. 5B, in the example of the HMD 1, the connector 27 is provided at the rear support section 23, similarly to the earphone jack 25. More specifically, the connector 27 is provided at the lower surface 23b of the rear support section 23, similarly to the earphone jack 25.

As depicted in FIG. 5B, the connector 27 is spaced from the center C1 in the left-right direction, in the same direction as the earphone jack 25. This ensures that the cable can be restrained from becoming an obstacle to the user when the HMD 1 is used effectively as compared to, for example, a structure in which the connector 27 and the earphone jack 25 are located on the opposite sides. In the example of the HMD 1, the connector 27 is spaced leftward from the center C1.

The connector 27 and the earphone jack 25 may be spaced rightward from the center C1, conversely to the example of the HMD 1.

As aforementioned, the mounting band 20 is provided with the light emitting sections 5 (see FIG. 5B). In the example of the HMD 1, the light emitting sections 5 are provided at the outer peripheral surface 23a of the rear support section 23, and are not provided at the lower surface 23b of the rear support section 23. In other words, the light emitting sections 5 are not provided on the surface where the earphone jack 25 and the connector 27 are provided. This structure ensures that the cable connected to the earphone jack 25 and the connector 27 can be restrained from becoming an obstacle in detection of light by an external camera.

As depicted in FIG. 1, in the example of the HMD 1, the mounting band 20 extends obliquely rearward and downward from the front support section 21 located at the frontmost portion thereof, in side view. The earphone jack 25 is located on the front side relative to the lower end (rear end) of the mounting band 20. Specifically, the earphone jack 25 is located at a position above the lower end (a lower end 23e of the rear support section 23) of the mounting band 20. A plug having a bushing (a resin for reinforcing a connection part between the plug and the cable) extending in the extending direction of a base portion of the plug may be connected to the base portion of the plug. The aforementioned layout of the earphone jack 25 ensures that, for example, when the HMD 1 is placed on a horizontal surface (for example, a table), it is possible to restrain a high load from being exerted on the bushing due to the contact of the bushing with the horizontal surface.

In the example of the HMD 1, the connector 27 is also located on the front side relative to the lower end (rear end) of the mounting band 20. In other words, the connector 27 is also located at a position above the lower end (the lower end 23e of the rear support section 23) of the mounting band 20. The positions of the earphone jack 25 and the connector 27 are not limited to those in the example of the HMD 1.

As depicted in FIGS. 1 and 3, the earphone device 30 has a guide section 35 located at the base portion of the plug 34. The guide section 35 is higher in rigidity than the cable 33. In other words, the guide section 35 is less liable to bend than the cable 33. The guide section 35 includes a right guide 35a defining the extending direction of the right cable 33R, and a left guide 35b defining the extending direction of the left cable 33L. The guide section 35 ensures that when the HMD 1 is used, the cable 33 can be restrained from becoming an obstacle to the user.

In the example of the HMD 1, as depicted in FIG. 5A, the right guide 35a and the left guide 35b are formed such that they are along an outer surface of the rear support section 23, in a bottom view of the HMD 1. More specifically, the right guide 35a extends along the lower surface of the rear support section 23 (see FIGS. 1 and 3). On the other hand, the left guide 35b extends obliquely forward and downward, as depicted in FIG. 1. This permits the left cable 33L to be curved such as to surround the lower side of the user's left ear.

As aforementioned, the guide section 36 to be attached to the attachment section 26 of the rear support section 23 is provided at an intermediate portion of the right cable 33R. As depicted in FIG. 3, the right cable 33R has a part 33d between the guide section 36 and the aforementioned guide section 35 (the part 33d will hereinafter be referred to as the "first part"). The first part 33d is disposed along the lower surface of the mounting band 20, more specifically, along the lower surface 23b of the rear support section 23. As aforementioned, in the example of the HMD 1, the rear support section 23 is curved, and the first part 33d is also curved, like the rear support section 23. This layout of the right cable 33R makes it possible to effectively restrain the right cable 33R from becoming an obstacle to the user.

The first part 33d is higher in rigidity than the other part of the cable 33, specifically, the left cable 33L and a part 33e between the right earphone 31R and the guide section 36 (the part 33e will hereinafter be referred to as the "second part"). In other words, the first part 33d has an outer skin which is higher in rigidity than the other part of the cable 33. This ensures that the curved shape of the first part 33d is maintained. The material of the first part 33d may not necessarily be a material having such a high rigidity, unlike the example of the HMD 1. In a further example, the guide section 36 and the guide section 35 may be connected with each other. In this case, the cable 33 may not have the first part 33d that has a high rigidity.

In the example of the HMD 1, the guide section 36 is higher in rigidity than the cable 33. In other words, the guide section 36 is less liable to bend than the cable 33. In addition, in the example of the HMD 1, the shape and position of the guide section 36 provided at an intermediate portion of the right cable 33R are substantially symmetrical with those of the guide section 35, with reference to the center C1 in the left-right direction of the mounting band 20 (see FIG. 5A). Specifically, the guide section 36 includes a left guide 36a extending from a base portion of the attached section (projection) 36c and defining the extending direction of the first part 33d, and a right guide 36b extending from the base portion of the attached section 36c and defining the extending direction of the second part 33e. According to the guide section 36, the extending direction of the right cable 33R can be defined, which ensures that when the HMD 1 is used, the cable 33 can be restrained from becoming an obstacle to the user.

In the example of the HMD 1, the left guide 36a and the right guide 36b are formed such that they are along the outer surface of the rear support section 23, in a bottom view of the HMD 1. More specifically, the left guide 36a extends along the lower surface 23b of the rear support section 23 (see FIG. 3). On the other hand, the right guide 36b extends obliquely forward and downward from the attached section 36c. This permits the second part 33e to be curved such as to surround the lower side of the user's right ear.

As has been described above, the HMD 1 includes the device main body 10 with the display device 11 incorporated therein, the mounting band 20 which extends toward the rear side from the device main body 10 and is used for mounting to the user's head, the right earphone holding section 24R which is provided at a right portion of the mounting band 20 and to and from which the right earphone 31R can be attached and detached, and the left earphone holding section 24L which is provided at a left portion of the mounting band 20 and to and from which the left earphone 31L can be attached and detached. According to the HMD 1, the user can recognize the positions of the earphones 31R and 31L without visual confirmation, and, therefore, convenience with respect to the earphones 31R and 31L can be enhanced.

The present invention is not limited to the HMD 1 described above, and may be modified as required.

For instance, an earphone device different from the aforementioned earphone device 30, for example, an earphone device not having the guide sections 35 and 36 may be mounted to the HMD 1.

In addition, the HMD 1 may not necessarily have the earphone jack 25 exposed to the outer surface thereof. In other words, part of the cable 33 may be accommodated in the housing 23H of the rear support section 23. Besides, other part (parts near the earphones 31R and 31L) of the cable 33 may only be exposed to the outside of the housing 23H.

In a further example, the cable 33 and the cable 41 may be united together. In this case, the cable 41 may be branched into two cables at an intermediate portion thereof, one of the two cables may be connected to the connector 27, and the other of the two cables may be provided with the earphones 31R and 31L.

The invention claimed is:

1. A head-mounted display comprising:
a main body with a display device incorporated therein;
a mounting band that extends toward a rear side from the main body and is used for mounting to a user's head;
a right earphone holding section which is provided at a right portion of the mounting band and to and from which a right earphone can be attached and detached; and
a left earphone holding section which is provided at a left portion of the mounting band and to and from which a left earphone can be attached and detached, wherein:
the right earphone holding section and the left earphone holding section respectively have openings into which the earphones can be inserted,
inner edges of the openings are configured to clamp outer peripheral portions of the earphones,
the right earphone and the left earphone respectively have ear pieces to be inserted into user's external auditory canals,
the inner edges of the openings are configured to clamp outer peripheral portions of the ear pieces, and
the inner edges of the openings are not caught on edges of the ear pieces.

2. The head-mounted display according to claim 1, wherein the right earphone holding section and the left earphone holding section are each formed using an elastically deformable material.

3. The head-mounted display according to claim 1, wherein the right earphone holding section and the left earphone holding section are bulging in relation to a surface of the mounting band or are recessed in relation to a surface of the mounting band.

4. The head-mounted display according to claim 1, wherein
the mounting band has an earphone jack, and
the earphone jack is spaced rightward or leftward from a center in regard of a left-right direction of the mounting band.

5. The head-mounted display according to claim 4, wherein
the mounting band has an attachment section to which an intermediate portion of the cable is attached,
the earphone jack is spaced in one of a rightward direction and a leftward direction from the center in regard of the left-right direction of the mounting band, and
the attachment section is spaced in an other of the rightward direction and the leftward direction from the center in regard of the left-right direction of the mounting band.

6. The head-mounted display according to claim 1, wherein the mounting band has at least two attachment sections to which an end portion or an intermediate portion of a cable connected to the right earphone and the left earphone is attached and which are spaced from each other in a left-right direction.

7. The head-mounted display according to claim 1, wherein
the mounting band has an earphone jack, and
the earphone jack is provided at a lower surface of the mounting band.

8. The head-mounted display according to claim 7, wherein
the mounting band extends obliquely rearward and downward, and
the earphone jack is located on a front side relative to a rear end of the mounting band.

9. The head-mounted display according to claim 1, wherein
the mounting band has a light emitting section to be detected by an external device, and an earphone jack, and
the light emitting section is not provided at a surface at which the earphone jack is provided.

10. The head-mounted display according to claim 1, comprising:
an earphone device that includes the right earphone, the left earphone, and a cable connected to the right earphone and the left earphone,
wherein the cable has a right cable that connects a plug located at an end portion of the cable and the right earphone, and a left cable that connects the plug and the left earphone, and
wherein the mounting band has an earphone jack into which the plug is inserted.

11. The head-mounted display according to claim 10, wherein the earphone device has a first guide section that is provided at a base portion of the plug, guides an extending direction of the right cable, and guides an extending direction of the left cable.

12. A head-mounted display comprising:
a main body with a display device incorporated therein;
a mounting band that extends toward a rear side from the main body and is used for mounting to a user's head;
a right earphone holding section which is provided at a right portion of the mounting band and to and from which a right earphone can be attached and detached; and
a left earphone holding section which is provided at a left portion of the mounting band and to and from which a left earphone can be attached and detached,
wherein the mounting band includes an earphone jack.

13. The head-mounted display according to claim 12, wherein the earphone jack is spaced rightward or leftward from a center in regard of a left-right direction of the mounting band.

14. The head-mounted display according to claim 13, wherein
the mounting band has an attachment section to which an intermediate portion of the cable is attached,
the earphone jack is spaced in one of a rightward direction and a leftward direction from the center in regard of the left-right direction of the mounting band, and
the attachment section is spaced in an other of the rightward direction and the leftward direction from the center in regard of the left-right direction of the mounting band.

15. The head-mounted display according to claim 12, wherein the mounting band has at least two attachment sections to which an end portion or an intermediate portion of a cable connected to the right earphone and the left earphone is attached and which are spaced from each other in a left-right direction.

16. The head-mounted display according to claim 12, wherein the earphone jack is provided at a lower surface of the mounting band.

17. The head-mounted display according to claim 16, wherein
the mounting band extends obliquely rearward and downward, and
the earphone jack is located on a front side relative to a rear end of the mounting band.

18. A head-mounted display comprising:
a main body with a display device incorporated therein;
a mounting band that extends toward a rear side from the main body and is used for mounting to a user's head;
a right earphone holding section which is provided at a right portion of the mounting band and to and from which a right earphone can be attached and detached; and
a left earphone holding section which is provided at a left portion of the mounting band and to and from which a left earphone can be attached and detached, wherein
the mounting band has a light emitting section to be detected by an external device, and an earphone jack, and
the light emitting section is not provided at a surface at which the earphone jack is provided.

19. A head-mounted display comprising:
a main body with a display device incorporated therein;
a mounting band that extends toward a rear side from the main body and is used for mounting to a user's head;
a right earphone holding section which is provided at a right portion of the mounting band and to and from which a right earphone can be attached and detached;
a left earphone holding section which is provided at a left portion of the mounting band and to and from which a left earphone can be attached and detached;
an earphone device that includes the right earphone, the left earphone, and a cable connected to the right earphone and the left earphone, wherein
the cable has a right cable that connects a plug located at an end portion of the cable and the right earphone, and a left cable that connects the plug and the left earphone, and
the mounting band has an earphone jack into which the plug is inserted.

20. The head-mounted display according to claim 19, wherein the earphone device has a first guide section that is provided at a base portion of the plug, guides an extending direction of the right cable, and guides an extending direction of the left cable.

* * * * *